UNITED STATES PATENT OFFICE.

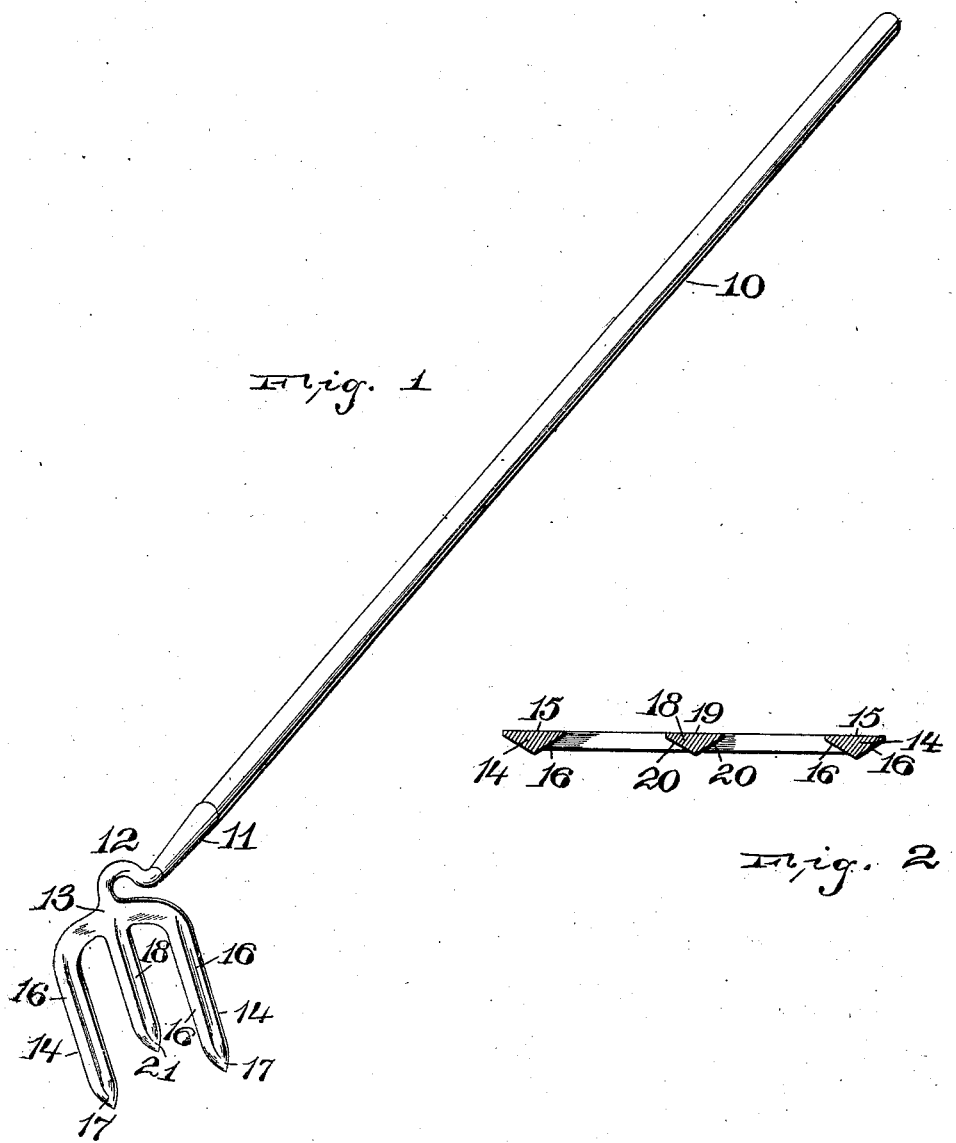

FRED A. BEACH, OF NEWARK, NEW JERSEY.

HOE.

No. 906,093.      Specification of Letters Patent.      Patented Dec. 8, 1908.

Application filed August 3, 1908. Serial No. 446,505.

*To all whom it may concern:*

Be it known that I, FRED A. BEACH, a citizen of the United States, residing at Newark, in the county of Essex and State of New Jersey, have invented certain new and useful Improvements in Hoes; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My improved invention relates to a hoe, and is designed to provide a hoe that is easy to manipulate, since its entrance into the ground is facilitated by reason of its formation, but it causes just as much ground to be displaced when it is drawn forward transversely of the prongs, so that a great deal of work is accomplished at each stroke, but as hereinbefore said the entrance and withdrawal of the hoe into and from the soil is comparatively easy when compared with the forcing of an ordinary flat scraper hoe into the ground. This desired result is brought about by the disposition of prongs, combined with their shape, and also on account of the disposition of the points of the prongs, due to the different lengths of the prongs.

The invention is illustrated in the accompanying drawing, in which

Figure 1 is a perspective view of my improved hoe, and Fig. 2 is a section across the prongs looking upward.

I provide the hoe with any usual form of handle 10 which provides for the manual manipulation of the tool, this handle having on one end a sleeve 11 which has attached thereto a shank 12 which is preferably curved and extends downwardly, ending up in a flat plate 13 which forms the body portion of the hoe. The flat plate 13 is formed into end prongs 14, which end prongs have the flat faces 15 as shown in Fig. 2, and the beveled surfaces 16. These end prongs are rounded off as at 17 and form points rounded on all sides except on the face 15. If desired, I may add a central prong 18 which has the flat surface 19, shown in Fig. 2, and the beveled surfaces 20, being provided with a rounded end 21 similar to the rounded ends 17 of the end prongs 14. These points 17 and 21 penetrate the ground easily, and when the tool is used by a gardener very little pressure is needed to force the hoe well down into the ground when necessary, which labor is very slight when compared with the force necessary to send an ordinary scraper hoe into the ground any distance below the surface.

The central prong is made shorter than the end prongs because it needs less force to thrust the two prongs into the ground for their greater distance, but the central prong penetrates the ground far enough to cause a co-acting function so that all three prongs will move a quantity of soil when the handle of the hoe is pulled, which soil is equal to about what would be moved by an ordinary flat scraper hoe. The prongs are strengthened by reason of the beveled faces 16 and 20 of the prongs forming beveled or pointed portions on the back of these prongs, but it will be noted that the faces of the prongs are flat so that the surfaces bearing on the soil, when the hoe is pulled, are substantially in line and simultaneously move the soil and thus carry it forward in the same way as an ordinary hoe would do.

Having thus described my invention, what I claim is:—

A hoe comprising a body portion formed of a flat plate of metal having prongs on its ends, these prongs having beveled backs and points on their ends, and a central prong shorter than the end prongs and extending substantially parallel with them, the central prong having a beveled back and a pointed end, the faces of the prongs being flat and substantially in line so as to co-act to move soil when the flat faces are manipulated through the ground.

In testimony, that I claim the foregoing, I have hereunto set my hand this 13th day of July 1908.

FRED A. BEACH.

Witnesses:
     WM. H. CAMFIELD,
     E. A. PELL.